United States Patent
Schneider et al.

(10) Patent No.: US 9,664,226 B2
(45) Date of Patent: May 30, 2017

(54) ASSEMBLY UNIT

(71) Applicant: Richard Bergner Verbindungstechnik GmbH & Co. KG, Schwabach (DE)

(72) Inventors: Wilhelm Schneider, Rednitzhembach (DE); Helmut Wierzba, Schwabach (DE)

(73) Assignee: RICHARD BERGNER VERBINDUNGSTECHNIK GMBH & CO. KG, Schwabach (DE)

( * ) Notice: Subject to any disclaimer, the term of this patent is extended or adjusted under 35 U.S.C. 154(b) by 0 days.

(21) Appl. No.: 14/762,443

(22) PCT Filed: Apr. 4, 2014

(86) PCT No.: PCT/EP2014/056872
§ 371 (c)(1),
(2) Date: Jul. 21, 2015

(87) PCT Pub. No.: WO2014/162005
PCT Pub. Date: Oct. 9, 2014

(65) Prior Publication Data
US 2015/0354619 A1    Dec. 10, 2015

(30) Foreign Application Priority Data

Apr. 5, 2013   (DE) .......................... 10 2013 005 751

(51) Int. Cl.
*F16B 21/18*    (2006.01)
*F16B 41/00*    (2006.01)

(52) U.S. Cl.
CPC ................. *F16B 41/002* (2013.01)

(58) Field of Classification Search
CPC ................. F16B 21/18; F16B 41/002
(Continued)

(56) References Cited

U.S. PATENT DOCUMENTS 2,235,530 A * 3/1941 Mercer ................... F16B 19/02
                                                      411/347
3,059,736 A * 10/1962 Boyd .................... F16B 41/002
                                                      29/512

(Continued)

FOREIGN PATENT DOCUMENTS

DE    198 02 497 A1    7/1998
DE    297 24 014 U1    10/1999
(Continued)

OTHER PUBLICATIONS

International Application No. PCT/EP2014/056872 International Preliminary Report on Patentability Dated Oct. 6, 2015 (7 Pages).

*Primary Examiner* — Roberta Delisle
(74) *Attorney, Agent, or Firm* — Keller Jolley Preece

(57) ABSTRACT

The invention relates to an assembly unit having an assembly part, which is penetrated by a bore and is to be fastened to a basic structure. The basic structure having a shaft, a head, and a fastener. The fastener having a fastening section on the end thereof facing away from the head, which is held captively and movably in the bore between a first axial position and a second axial position. The assembly unit having a spring, which encompasses the shaft and is formed from a wound spring wire and which holds the fastener captively in the bore. The spring wire is wound in a spiral shape such that the windings thereof do not overlap in the radial direction relative to the spring axis.

20 Claims, 18 Drawing Sheets

(58) Field of Classification Search
USPC .......... 411/12, 302, 341–343, 347, 353, 432, 411/517
See application file for complete search history.

(56) References Cited

U.S. PATENT DOCUMENTS

| | | | | |
|---|---|---|---|---|
| 3,188,115 A | * | 6/1965 | Morrish | F01N 13/1811 285/18 |
| 3,263,728 A | | 8/1966 | Lynch | |
| 3,343,581 A | * | 9/1967 | Martin | F16B 5/0208 292/251 |
| 3,437,119 A | * | 4/1969 | Dey | F16B 41/002 411/107 |
| 3,934,315 A | * | 1/1976 | Millheiser | F16L 37/025 24/453 |
| 5,042,880 A | * | 8/1991 | Garuti | B60B 3/14 301/35.624 |
| 5,059,075 A | * | 10/1991 | Kelly | F16B 41/002 411/107 |
| 6,074,146 A | | 6/2000 | Soemer | |
| 6,752,577 B2 | * | 6/2004 | Chen | G06F 1/20 165/80.3 |
| 6,786,691 B2 | * | 9/2004 | Alden, III | F16B 35/041 411/352 |
| 8,491,246 B2 | * | 7/2013 | Chao | F16B 21/02 411/341 |
| 2003/0086772 A1 | * | 5/2003 | Giannakakos | C22C 14/00 411/432 |
| 2011/0255935 A1 | * | 10/2011 | Chen | F16B 5/0208 411/347 |

FOREIGN PATENT DOCUMENTS

FR     2 946 106 A1    12/2010
GB    2 251 911 A     7/1992

* cited by examiner

ASSEMBLY UNIT

CROSS-REFERENCE TO RELATED APPLICATIONS

This application is a national phase entry under 35 U.S.C. §371 of International Application No. PCT/EP2014/056872, filed Apr. 4, 2014, which claims the benefit of German Application No. 10 2013 005 751.5, filed Apr. 5, 2013. The entire contents of each of the foregoing patent applications are hereby incorporated by reference.

BACKGROUND OF THE INVENTION

1. Field of the Invention

The invention relates to an assembly unit.

2. Background and Relevant Art

In many branches of industry, components or assembly parts which have to be fastened or mounted on a basic structure are already provided with fastening means in a captive manner by the manufacturer such that such an assembly unit facilitates the subsequent assembly of the assembly part on a basic structure. The assembly parts or a fastening flange which is present thereon comprise at least one bore which penetrates them and which is penetrated by the shank of a fastening means, for example of a screw. The fastening means additionally comprises a head, which protrudes radially beyond the shank and overlaps the bore edge of the bore in a radial manner, and, on the end remote from the head of the fastening means, a fixing portion which is realized, for example, as a thread. For fixing the assembly part on the basic structure, the fixing portion engages in a fixing bore in the basic structure, for example a threaded bore. The fastening means is held in a captive manner in the bore so as to be movable between a first axial position and a second axial position. In the first axial position the shank protrudes from the assembly surface of the assembly part remote from the head at a maximum protrusion which comprises at least part of the fixing portion. In the second axial position the shank preferably does not protrude from the assembly surface or protrudes at a protrusion that is reduced compared to the first axial position. During the course of the assembly, the assembly part can consequently be positioned either up to a small spacing which corresponds to the reduced protrusion or, where there is no protrusion, can be positioned on the basic structure so as to form mutual surface contact.

DE 198 02 497 A1 makes known an assembly unit where the fastening means is held so as to be axially movable in the bore of the assembly part by means of a compression spring which is formed from helically wound spring wire and encompasses the shank of the fastening means. The compression spring is fixed with its one end, close to the head, on the shank of the fastening means and with its other end, remote from the head, on the assembly part. Disadvantageous in the case of the known assembly unit is, in particular, that the depth of penetration of the fastening means or of its fixing portion into a counter bore of the basic structure, in the case of a screw the depth of penetration thereof, that is necessary for sufficient fixing has an effect on the axial space required for the compression spring in the final assembly state in which the assembly part is clamped with the basic structure. The greater namely the depth of penetration of the fixing portion, the greater the number of spring wire windings at a given pitch of said spring wire windings. As the spring wire windings in the maximum shortened state of the compression spring abut against one another axially, the number of windings is added to a corresponding length. If, for example, the spring in its maximum shortened state is to be arranged fully inside the bore of the assembly part, an assembly part with a corresponding bore length or thickness is necessary.

Proceeding from here, it is the object of the invention to propose a correspondingly improved assembly unit.

BRIEF SUMMARY OF THE INVENTION

Said object is achieved with an assembly unit according to the preamble of claim 1 in that for captively mounting the fastening means on the assembly part a spring is provided, the spring wire of which is wound helically in such a manner that the windings thereof do not overlap in the radial direction with reference to the spring axis. As a result of said development, it is ensured that an increase in the number of windings of the spring on account of a greater displacement path of the fastening means or a greater depth of penetration into a counter bore of the basic structure does not affect the axial space required for the spring. As a result of the named type of windings, in its maximum shortened state, the spring takes on the form of a flat spiral spring, the dimension thereof in the axial direction depending purely on the axial thickness of the spring wire and not on the number of windings. When the number of windings is changed, just the outside diameter or the space required for the spring in the radial direction is changed. A spring of the type referred to can be used, consequently, in particular in the case of relatively thin assembly units which are penetrated by a bore with a smaller length, the fastening means thereof comprising a comparatively large length of penetration or screw-in and consequently protruding from the assembly surface of the assembly part with a correspondingly large protrusion in the first axial position.

The spring in the case of an assembly unit according to the invention can be a compression or tension spring, said spring comprising its maximum shortened state in each case in the first axial position of the fastening means. In this case, a compression spring assumes said state in the loaded state, that is with full spring compression, and a tension spring in the non-loaded state.

When the fastening means is positioned in its second axial position, the spring is situated in an elongated state in which it protrudes from the top surface which is located opposite the assembly surface of the assembly part. In said situation, a helical spring of the type known from DE 198 02 497 A1, in particular when the spring wire is thin, has low tipping stability or lateral stability. The result is that the fastening means can move into an unwanted oblique position with regard to the spring axis, which, among other things, makes introducing the fixing portion of the fastening means shank into a counter bore of the basic structure more difficult. An incorrect position of the fastening means of this type is countered in the case of a preferred development of the assembly unit as a result of the windings of the spring wire overlapping in the direction of the spring axis and, as a result of the overlapping, causing the spring to stabilize or stiffen laterally. In this case, there is a similar situation as in the case of tubes which are telescoped into one another. Quite particularly advantageous, in this case, is a development of the spring where the spring wire consists of a band with wide sides which extend in the direction of the center longitudinal axis. Generally speaking in this case, the dimension of the spring wire is greater in the axial direction than in the radial direction.

The fastening means, as mentioned above, is fixed on the assembly part by means of the spring so as to be axially displaceable between a first and a second axial position. The axial displacement path necessary in this case can be ensured just by the spring travel, i.e. the spring travel corresponds to the axial displacement path of the fastening means. If, however, as provided in the case of a preferred realization variant, the spring is fixed on the assembly part and/or on the fastening means so as to be axially movable about a displacement path, the displacement path is produced from the addition of the spring travel and the maximum displacement path of the spring. In the case of a predetermined axial displacement path of the fastening means, a shorter dimensioned and correspondingly more cost-efficient spring which is realized with a smaller axial installation height can then be used.

In order to reduce the axial installation height of the assembly unit further, the spring is fixed at least in part inside the bore. In this case, it is particularly advantageous when, in its maximum shortened state, the spring comprises a length which is smaller than the bore length, wherein the spring is arranged fully inside the bore. In this case, in the final assembly state in which the assembly part is clamped with the basic structure, the fastening means acts upon the assembly part by way of its head. The prestressing force of the fastening means is consequently introduced into the basic structure by means of the assembly part.

In the case of a preferred development, the length of the spring in its maximum shortened state or the axial spring wire thickness thereof is dimensioned such that in the final assembly state in which the assembly part is clamped with the basic structure, the head of the fastening means acts upon the maximum shortened spring in an axial manner, at least the predominant part of the prestressing force of the fastening means being directed into the basic structure in a main force-fitting manner by means of the spring. The spring consequently fulfills a dual function by, on the one hand, acting as a spacing element which transmits the prestressing force of the fastening means and, on the other hand, enabling the axial displacement of the fastening means relative to the assembly part. A spring acting as a spacing element is in particular expedient when the assembly part consists of a material, for instance an aluminum foam or a plastics material, which cannot be acted upon at least permanently with the prestressing force of the fastening element, e.g. because it tends to flow under load. As an assembly part consisting of such a material is simply clamped with the basic structure in a force shunt, it is exposed to a comparatively small load. So that the spring can be acted upon in the main force load and the assembly part can be acted upon in the force shunt, the length of the spring in its maximum shortened state must be matched to the length of the bore in the assembly part. The length of the maximum shortened spring is preferably slightly smaller than the bore length such that the assembly part is axially compressed to a certain extend in the bore region and the named force shunt can be realized. The assembly unit known from DE 198 02 497 A1 poses problems in this sense. By the spring windings being layered axially one above another in the maximum shortened state, which is also designated as a blocked state in the case of a helical spring, the tolerances thereof add up. The production of a helical spring with a predefined block length which is precisely matched to the bore length is consequently complex.

The spring can be fixed on the assembly part in different ways. Thus, it is conceivable for the spring end thereof remote from the head to be fixed in the bore of the assembly part by means of a press fit or also with axial mobility. In the event of assembly parts with a small thickness at least in the region of the bore it is, however, provided that the spring is fixed by way of its spring end, close to the head, on the top surface of the assembly part remote from the assembly surface. In the case of such a development, it is advantageous when fixing points, which are arranged on the top surface of the assembly part and hold the spring end remote from the head are at a radial spacing to the spring axis which is greater than the diameter of the fastening means head. In this way, it is ensured that the bottom surface of the head does not act upon the fixing points but on the side of the spring facing the head or on the spring wire windings which extend in a planar plane at least in the final assembly state. The named fixing points, in this case, are preferably tongues which are arranged on the top surface of the assembly part and clamp the outermost winding of the spring wire between them and the top surface of the assembly part.

In the case of the fixing or assembly of an assembly part on a basic structure, for example brought about by tolerances, a bore of the assembly part may comprise an axial offset in relation to a counter bore which interacts with it in the basic structure. Problem-free introduction of the fixing portion of the fastening means into the counter bore, however, is nevertheless possible when there is radial play between the spring and the assembly part and/or between the spring and the shank of the fastening means.

When the fastening means is a screw, i.e. when the fixing portion is realized as a thread, in the case of a preferred realization variant it is provided that the winding direction, in which the spring wire is wound from radially outside to radially inside, when viewed in a direction which extends parallel to the spring axis, away from the head of the fastening means and toward the end thereof remote from the head, corresponds to the direction of rotation of the thread. For example, in the case of a right-hand thread which has to be rotated clockwise so that it can engage with a counter thread, the spring wire is wound clockwise from outside to inside. The effect of the development in question is that where frictional locking is produced between the spring and the bottom surface of the head of the fastening means and/or the top surface of the assembly part when the fastening means is screwed into the counter bore of the basic structure, the result is a radial constriction of the spring wire windings and consequently an enlarging of the radial spacing between said spring wire windings. In contrast, where the winding direction is in the opposite direction with regard to the thread, there is the risk of the spring wire windings being radially widened and pressed against one another, which could obstruct the spring transferring into its maximum shortened state.

BRIEF DESCRIPTION OF THE DRAWINGS

The invention is explained in more detail below also with regard to further features and advantages by way of the description of exemplary embodiments and with reference to the accompanying drawings, in which.

DETAILED DESCRIPTION

Figure 1:
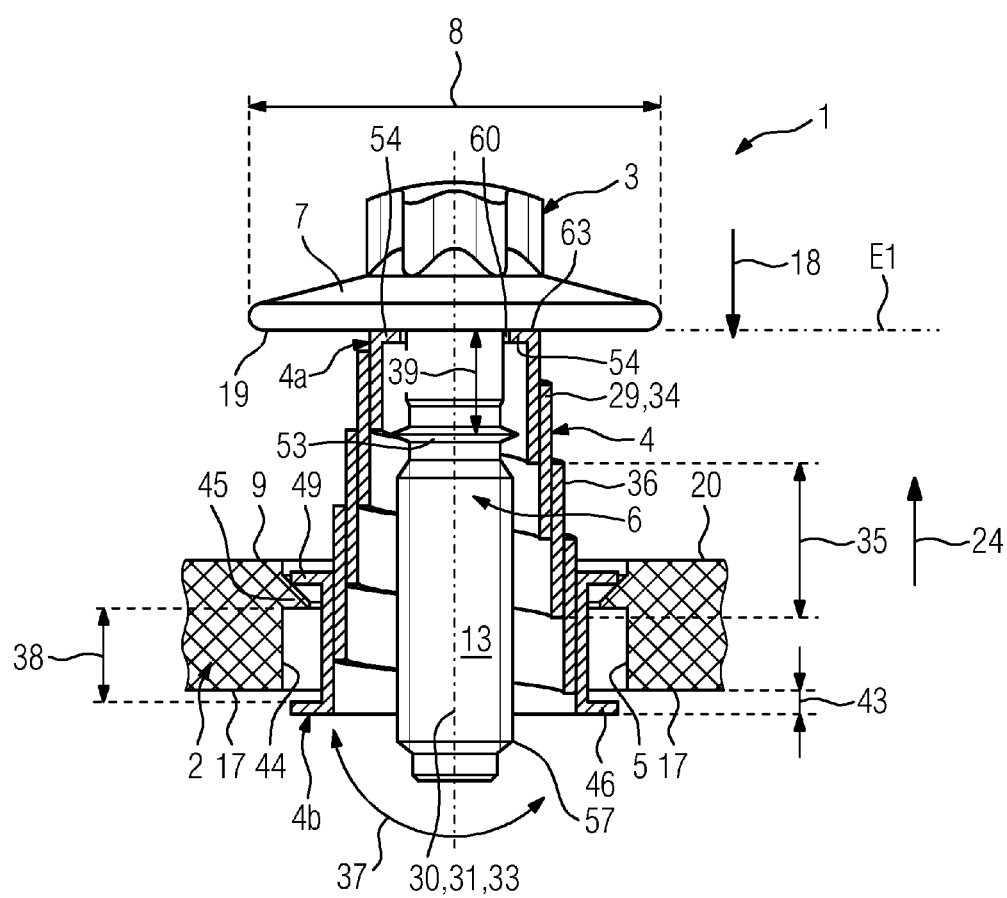
FIG. 1 shows an assembly unit, including an assembly part, a fastening means and a spring which is developed as a compression spring.
Figure 2:
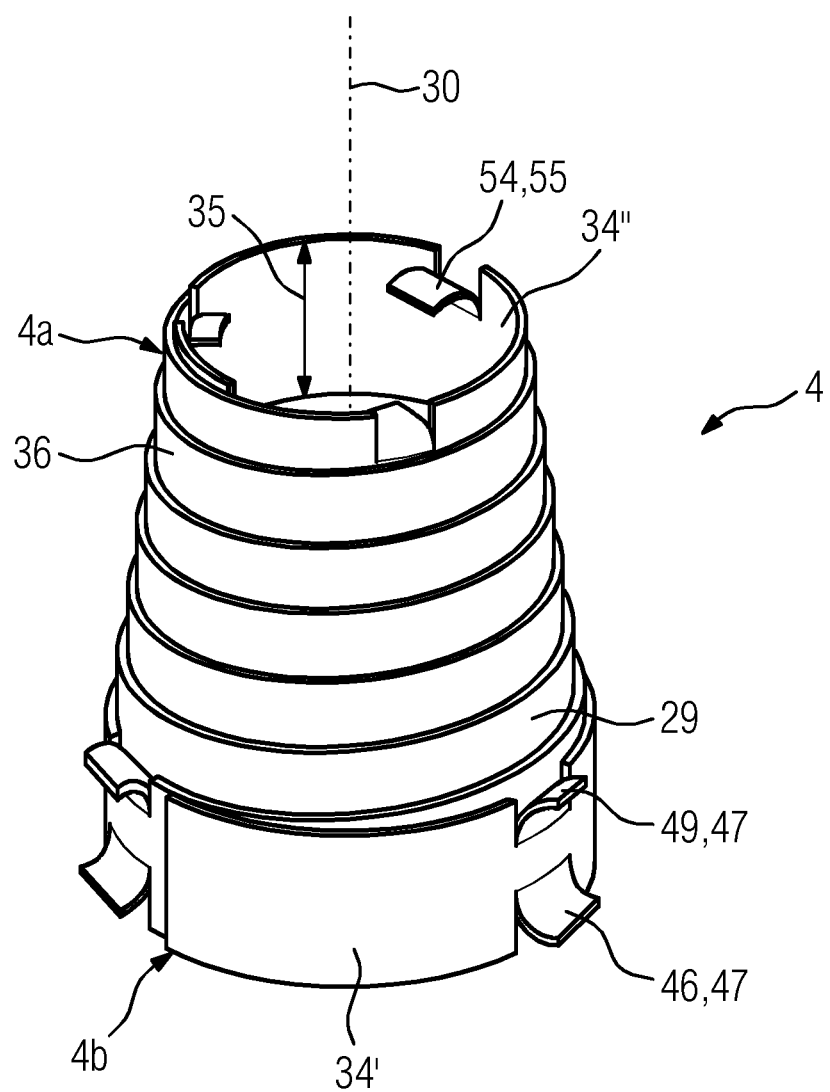
FIG. 2 shows a perspective view of the spring from FIG. 1.

The assembly units 1 shown in the illustrations include an assembly part 2, at least one fastening means 3 and a spring 4. The assembly part 2 is penetrated by at least one bore 5. The fastening means 3 comprises a shank 6, at the one end of which a head 7 is integrally formed. The diameter 8 thereof is dimensioned such that it overlaps the bore edge 9 of the bore 5 facing it in a radial manner. At least one end portion of the bore 5, which extends up to the bore edge 9, consequently comprises a diameter 10 which is smaller than the diameter 8 of the head 7. The shank 6 carries a fixing portion 13 which interacts with a bore 15 that is present in the basic structure 14 for fixing the assembly part 2 on said basic structure. In the case of the exemplary embodiments shown in the illustrations, the fastening means is a screw, i.e. the fixing portion 13 is formed by a thread 11 which interacts with an internal thread 16 of the bore 15.

Figure 9:
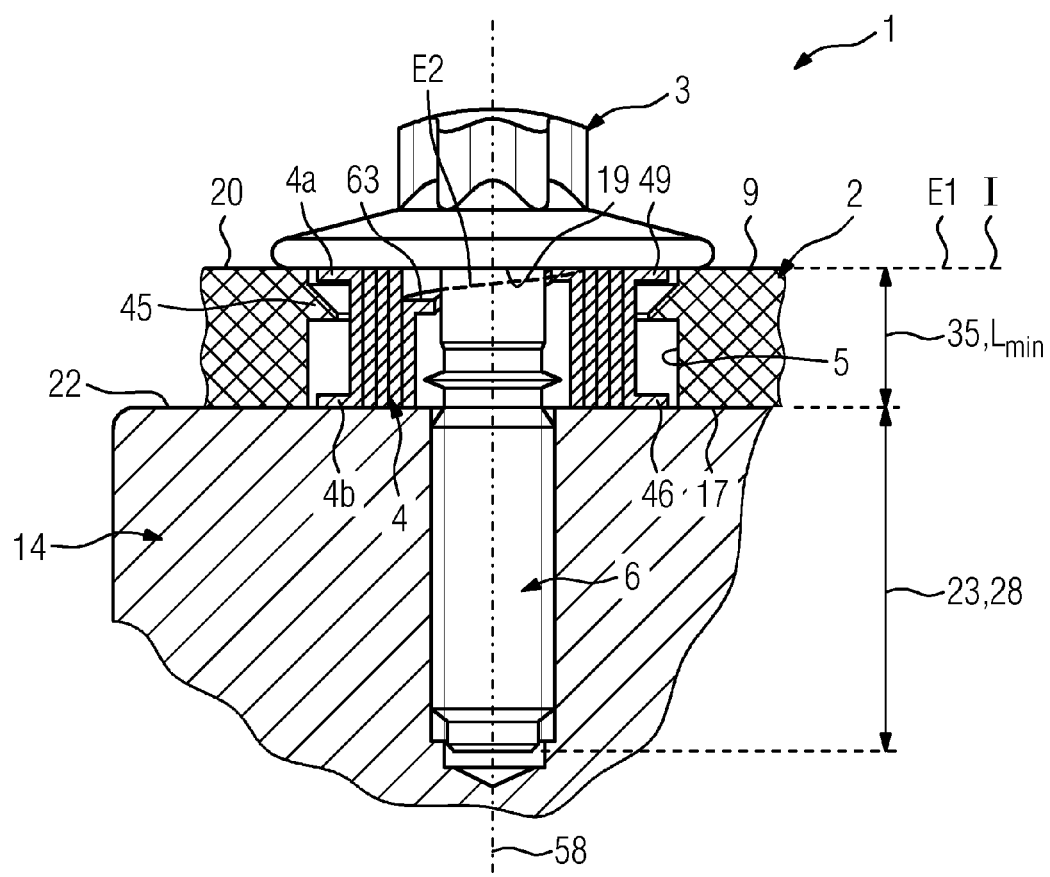
FIG. 9 shows the final assembly state of the assembly unit where the fastening means engages fully in the counter bore with its thread.

The fastening means is held in the bore 5 of the assembly part 2 so as to be movable between a first axial position I and a second axial position II. The captive mounting in a first axial direction 18, which extends away from the head 7 and toward the basic structure 14 or toward an assembly surface 17 of the assembly part 2 which abuts against said basic structure in the final assembly state, is ensured by the head 7. In the first axial position I of the fastening means 3, the head 7 abuts by way of the bottom surface 19 of its head against the top surface 20 of the assembly part 2 which is located opposite the assembly surface 17 or against the bore edge 9 or, where applicable, against the end 4a, close to the head, of the maximum shortened spring 4. In said situation, which corresponds to the final assembly state according to FIG. 9, the shank 6 protrudes from the assembly surface 17 with a maximum protrusion 23 (FIG. 9).

The captive mounting of the fastening means 3 on the assembly part 2 in a second axial direction 24, which extends from the end 4b of the shank 6, remote from the head, and toward the head 7, is ensured by means of the spring 4. Said spring is a spring formed from a helically wound spring wire 29, the windings 34 thereof encompassing the shank 6 of the fastening means 3 at a radial spacing. The spring wire windings 34 are wound such that they do not mutually overlap with reference to the spring axis 30 which extends along the center longitudinal axis 33 of the bore 5. In this way, it is ensured that in the final assembly state or in the first axial position I, e.g. when the head 7 rests with the bottom surface 19 its head on the top surface 20 of the assembly part 2, the spring 4 can assume a maximum shortened state with a minimum length $L_{min}$ which corresponds to the axial length 35 of the spring wire 29. The result is a correspondingly small axial installation height of the spring 4 and accordingly a small axial installation height of the assembly unit 1 fixed on the basic structure. The windings 34 of the spring 4 are additionally dimensioned in the radial direction such that at least some of them are overlapped radially by the head 7 of the fastening means 3.

The spring 4 is connected to the assembly part 2 by way of its end 4b, remote from the head, and to the shank 6 of the fastening means 3 by way of its end 4a, close to the head. On account of the length of the spring 4 which is axially variable by a spring travel 27, the fastening means 3 is displaceable into the second axial position II or is held in said position by the spring 4. The displacement path 28 (FIG. 9) or the axial spacing between the first and second axial position I, II corresponds at least to the spring travel 27. The displacement path 28 is preferably chosen in each case in such a manner that in the second axial position II, the shank 6 of the fastening means 3 does not protrude from the assembly surface 17 of the assembly part 2 such that said assembly surface is able to be placed against a counter surface 22 of the basic structure 14 or moved into surface contact with said counter surface.

In the case of the exemplary embodiments shown in FIGS. 1 to 10, the spring 4 is fixed in the bore 5 of the assembly part 2 by way of its end 4b, remote from the head. Its length $L_{min}$ in the maximum shortened state is dimensioned such that it corresponds substantially to the bore length 40 (FIG. 3) such that the spring 4 can be arranged substantially fully inside the bore 5. Where assembly parts 2 are produced from solid material which withstands the prestressing force of the fastening means 3, it is not necessary for the spring 4 to assume the function of a spacing element. The head 7 of the fastening means 3 is supported rather in the final assembly state on the bore edge 9 of the assembly part 2, the prestressing force of the fastening means 3 being introduced into the basic structure 14 in a main force locking manner by means of the assembly part 2. The length $L_{min}$ of the spring 4 in the present case is expediently slightly smaller than the bore length 40.

If assembly parts 2, which consist of a less loadable material, are to be connected to a basic structure 14, a spring 4 is provided, the minimum length $L_{min}$ of which is dimensioned such that, in the final assembly state, the fastening means head 7 acts upon the spring 4 in an axial manner. In this case, the entire or at least a predominant part of the prestressing force of the fastening means 3 is directed into the basic structure 14 in a main force locking manner by means of the maximum shortened spring 4. The minimum length $L_{min}$ of the spring 4, in this case, is expediently also slightly smaller than the bore length 40 such that in the final assembly state, on account of the influence of the prestressing force of the fastening means 3, the head 7 thereof compresses the assembly part 2 axially to a certain extent in the region of the bore edge 9. Part of the prestressing force of the fastening means, in this case, is utilized in the force shunt for pressing the assembly part 2 axially against the basic structure 14. By far the greater part of the prestressing force, however, when as a result of the axial compression of the assembly part 2 the head bottom surface 19 approaches the spring 4 and finally acts upon the same in its bore edge region, is directed into the basic structure 14 in the main force load by means of the spring 4.

Figure 19:
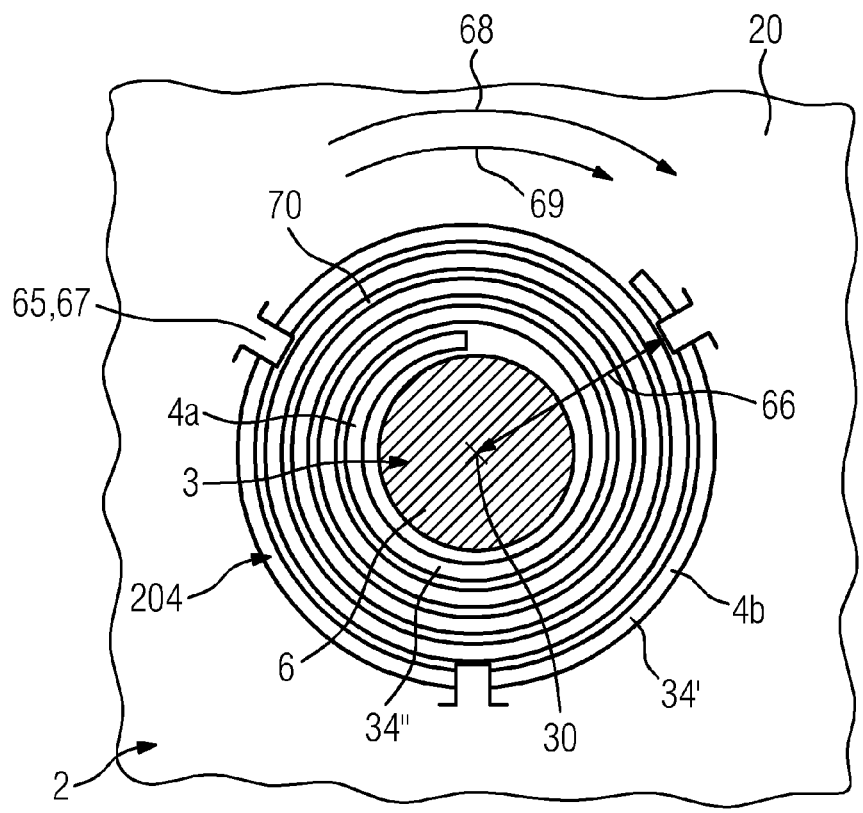
FIG. 19 shows a sectional representation corresponding to the line XIX-XIX in FIG. 18.

The windings 34 of the spring wire 29 are dimensioned in the axial direction such that they also overlap in the second axial position II of the fastening means 3 in the direction of the spring axis 30. The spring 4 is stabilized as a result in the lateral direction, that is in a direction which extends transversely with respect to the spring axis 30, as a result of which a fastening means 3, which is situated in the second axial position II, is centered in the basic structure 14 with reference to the center longitudinal axis 58 of the bore 15 during the course of the assembly. The introduction of a fastening means 3 into the bore 15 is facilitated as a result. The risk of the fastening means 3 tipping laterally (arrow 37 in FIG. 1) is also at least reduced. The referred to stabilizing function of the spring 4 is then particularly marked when the spring wire 29 is formed from a band, the wide sides 36 of which extend in the direction of the spring axis 30, and when the axial overlapping regions which are formed from such a spring wire 29 abut against one another, between which there is therefore not any or only a small radial spacing 70 (FIG. 19).

Figure 3:
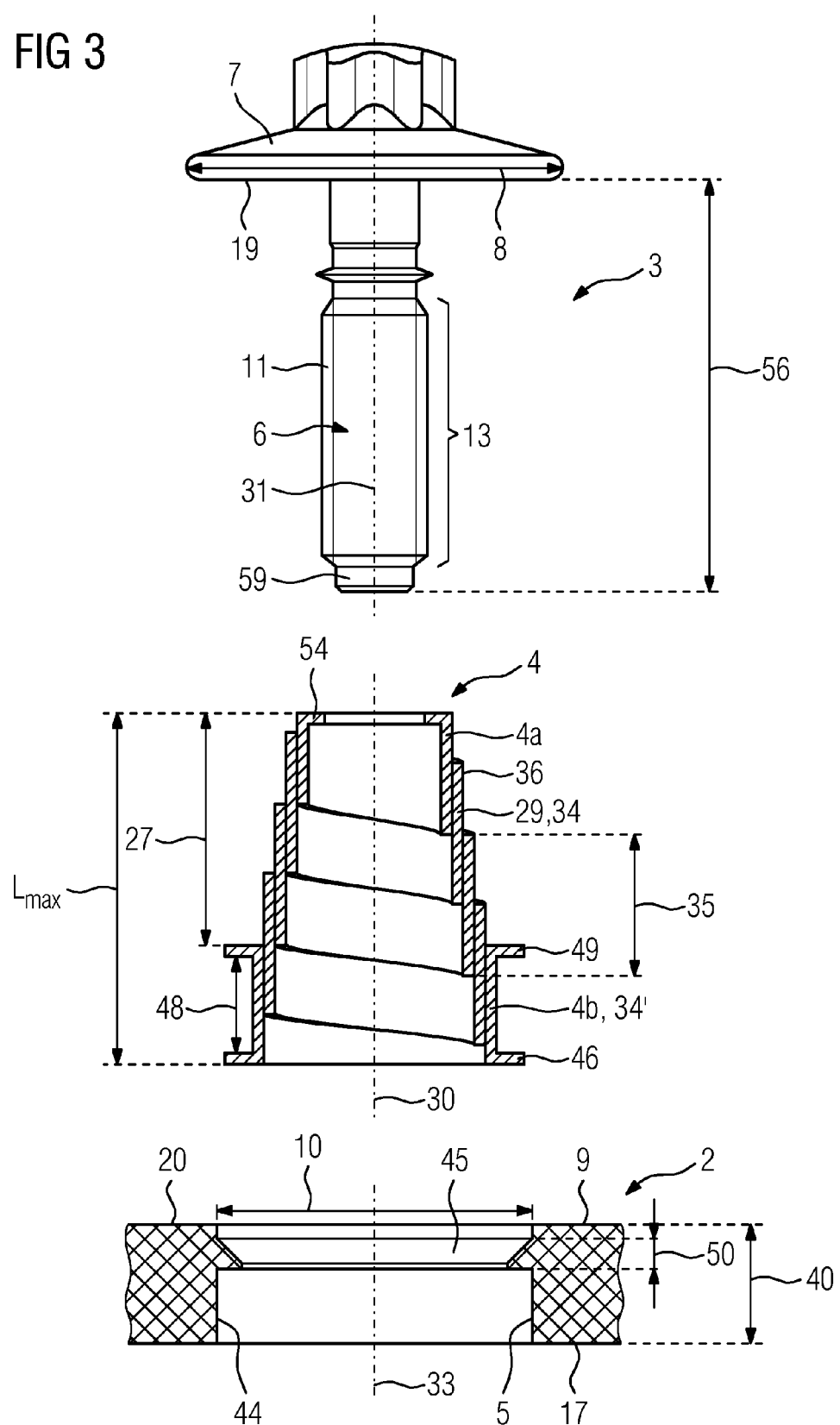
FIG. 3 shows individual representations of the individual parts of the assembly unit of FIG. 1.
Figure 4:
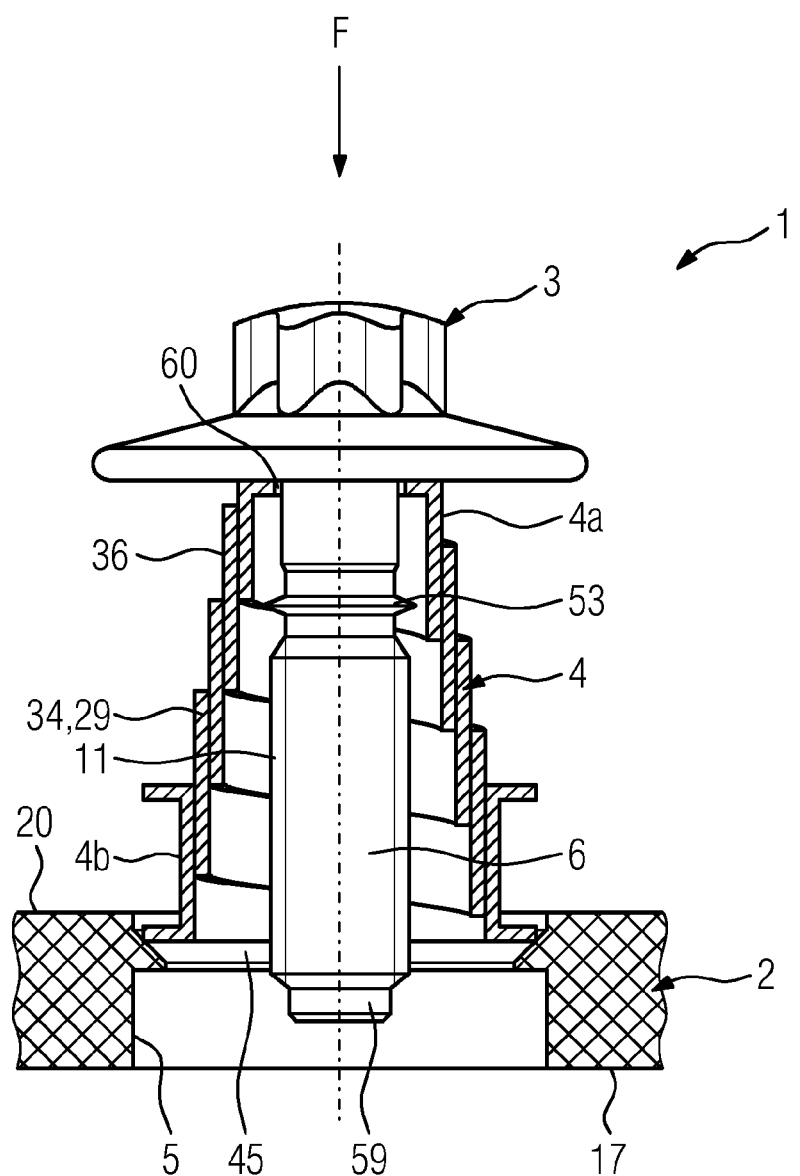
FIG. 4 shows a representation which illustrates the assembling of a unit, which consists of fastening means and spring, and an assembly part.
Figure 5:
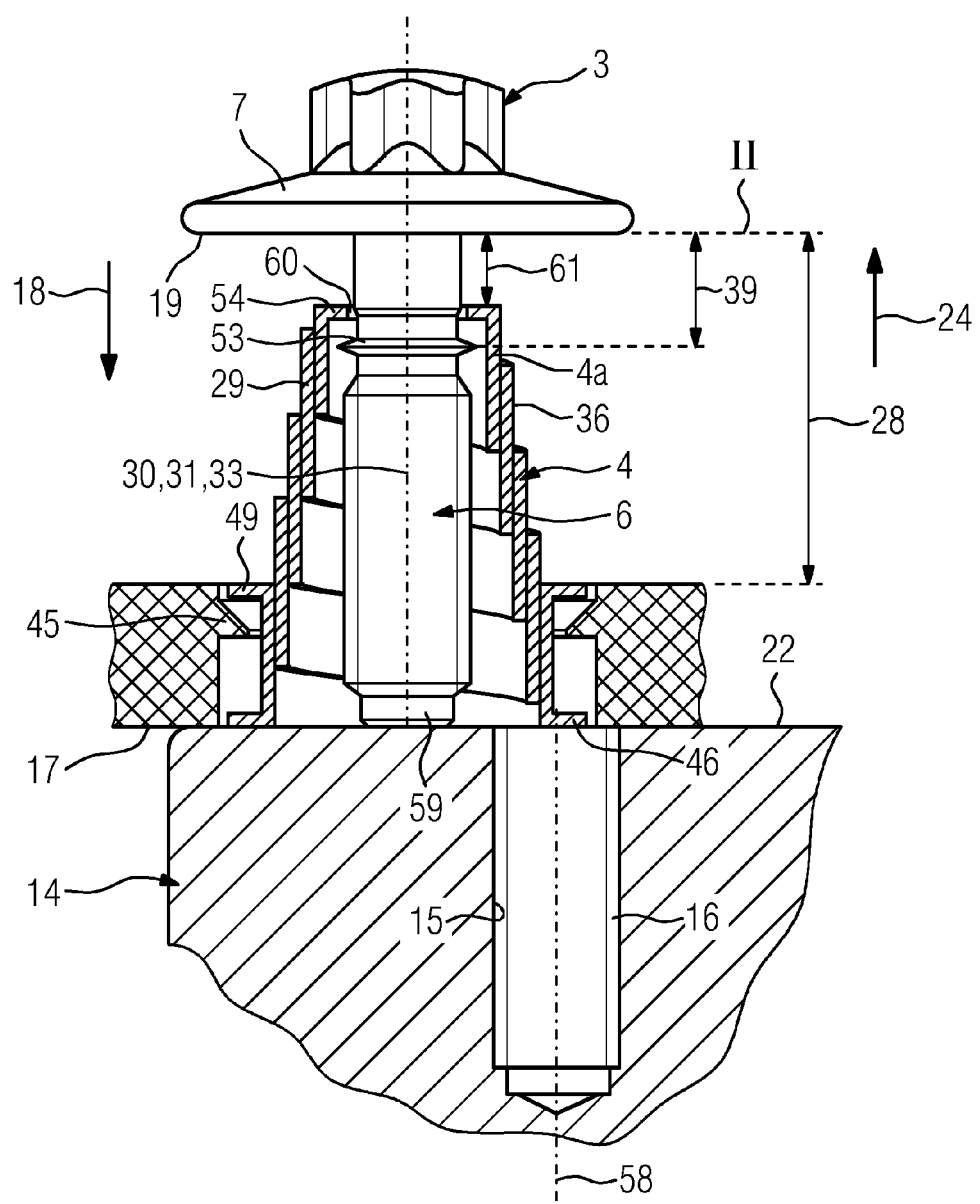
FIG. 5 shows a pre-assembly state where the assembly unit is placed on a basic structure and the fastening means is situated in its second axial position.

As mentioned above, the displacement path 28 of the fastening means 3, which said fastening means runs through between the axial positions I and II, corresponds at least to the spring travel 27 of the spring 4. The displacement path 28 can be enlarged independently of the spring travel 27 when the spring 4 is fixed on the assembly part 2 and/or on the fastening means 3 so as to be axially movable. The maximum possible displacement path 28 is produced then from the sum of the spring travel 27, the axial play 38 between the spring 4 and the assembly part 2 and the axial play 39 between the spring 4 and the shank 6 of the fastening means 3 (FIGS. 1 and 3). The spring 4, in this case, as is the case in the exemplary embodiments of FIGS. 1-9, can be fixed in the bore 5 so as to be axially movable in such a manner that it is displaceable beyond the assembly surface 17, i.e. protrudes from said assembly surface with a protrusion 43 (FIG. 1).

Figure 10:
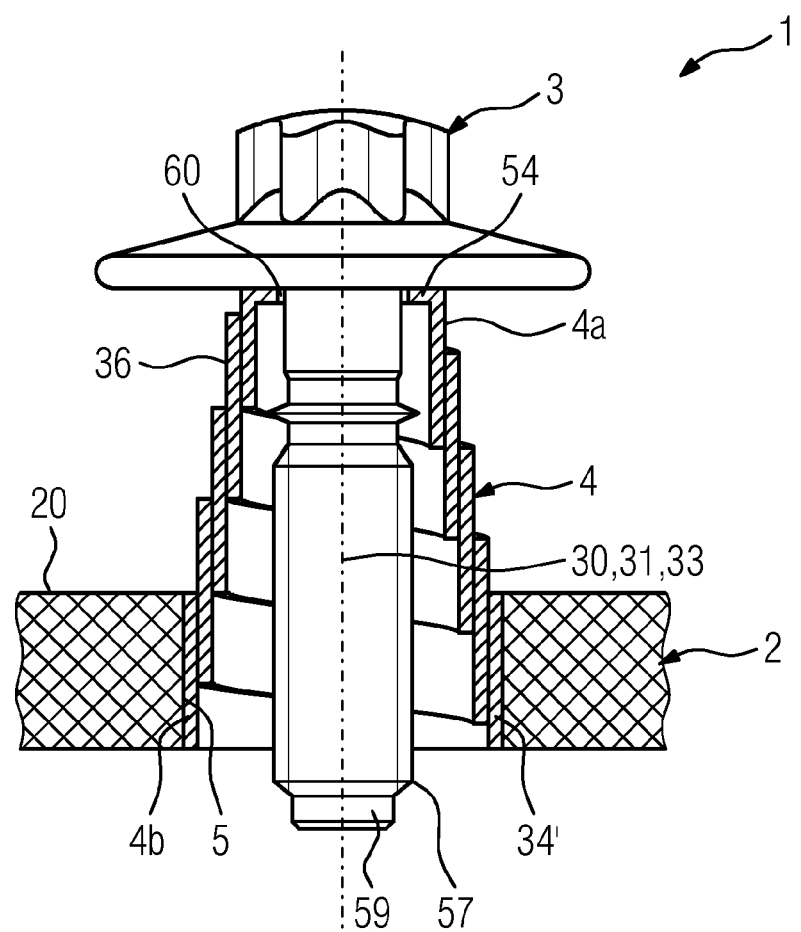
FIG. 10 shows a representation corresponding to FIG. 1 of an exemplary embodiment where the spring is fixed on the assembly part so as not to be axially movable.

Along with a mounting of the spring 4 with axial play 38 in the bore 5, a fixing where such an axial play is not provided can also be considered. Such a case is shown in FIG. 10. In this case, the spring end 4b, remote from the head, or the spring wire winding 34' which is located the furthest on the outside is fixed in an axially fixed manner, for example pressed into the bore 5 with a radial oversize and/or fixed by means of adhesion or welding. If axial play 38 of the spring 4 is provided, this is achieved by a positive-locking fit between the assembly part 2 and the spring 4. To this end, an engaging-behind element 45, which forms the named positive-locking fit with the spring end 4b, remote from the head, protrudes radially inward from the wall of the bore 5. A radially outwardly projecting counter element 46 is present on the spring end 4b, remote from the head, or on the winding 34' situated the furthest on the outside for this purpose. Said counter element extends so far in the radial direction that on its side facing the head 7, it is engaged behind or radially overlapped by the engaging-behind element 45, which is realized preferably as an annular projection. The counter element 46 is preferably formed from individual projections 47 (FIG. 2) which are spaced apart in the circumferential direction of the spring 4. The counter elements 46, in the case of a band-like spring wire 29, are tongues which are cut free from said band-like spring wire and bent radially outward. The counter elements 46, in particular when they are realized as tongues, are flexible to a certain extent. When the spring 4 and the assembly part 2 are joined together, consequently the spring 4, for example proceeding from the situation shown in FIG. 4, can be inserted into the bore 5 of the assembly part 2 as a result of being acted upon axially with a force F, the counter element 46 deforming elastically and passing the engaging-behind element 45.

In addition to the above-mentioned positive-locking fit, the spring end 4b, remote from the head, is fixed in the bore 5 with a second positive-locking fit in the first axial direction 18 which points away from the head 7. Between the axial position of said positive-locking fit and the axial position of the positive-locking fit in the second axial direction 24 which points to the head, there is an axial spacing 48 which enables the axial mobility of the spring 4 or the axial play 38. The axial spacing 48, in this case, is greater than the axial length 50 of the engaging-behind element 45 (FIG. 3). A second counter element 49 is present on the spring end 4b, remote from the head, for realizing the second positive-locking fit. Said second counter element is preferably also formed by individual elements 47 which are spaced apart in the circumferential direction of the spring 4 and are tongues which are cut free from the spring end 4b, remote from the head, or from the radially outermost spring wire winding 34' and are bent radially outward.

The spring end 4a, close to the head, is fixed on the shank 6 of the fastening means 3 with a positive-locking fit in the axial direction 18 which points away from the head 7. The positive-locking fit is formed as a result of an engaging-behind element 53, which is realized as an annular projection, protruding from the shank 6. Said engaging-behind element engages behind a counter element 54, which projects radially inward from the spring end 4a, close to the head, or from the radially innermost spring wire winding 34", on the side thereof remote from the head 7. The counter element 54 is also realized in the form of individual projections 55 (FIG. 2) which are spaced apart in the circumferential direction of the spring 4 and are cut free from the preferably band-shaped spring wire 29 and are bent radially outward.

In the case of the exemplary embodiments according to FIGS. 1-10, the spring 4 is a compression spring. Said compression spring comprises its maximum length $L_{max}$ in the non-loaded state (FIG. 3). The length 56 of the shank 6 is greater than the length $L_{max}$ such that the fastening means 3, at least when it abuts against the spring end 4a, close to the head, by way of the bottom surface 19 of the head, protrudes with a protrusion 57 from the spring end 4b, remote from the head, and where applicable from the assembly surface 17 of the assembly part 2. When an assembly part 2 corresponding to FIG. 1 is placed onto the counter surface 22 of a basic structure 14 during the assembly, the spring 4 and the fastening means 3 are displaced in the axial direction 24. Such a displacement is possible on account of the axial play 38 between the spring 4 and the assembly part 2 as well as the axial play 39 between the spring 4 and the shank 6. The axial play 39 is chosen such that in the pre-assembly position according to FIG. 5 there is an axial spacing 61 between the spring end 4a, close to the head, and the bottom surface of the head. When the assembly part 2 assumes on the basic structure 14 a position in which the center longitudinal axis 33 of the bore 5 of the assembly part 2 is in alignment with the center longitudinal axis 58 of the bore 15 that is present in the basic structure 14, the shank 6 can be inserted into the bore 15 of the basic structure 14 without the spring 4 being axially compressed and without the application of force necessary for this by way of its end remote from the head, on which a radially narrowed search portion 59 is preferably present, and the thread 11 of the fixing portion 13 can be screwed a little way into the internal thread 16 of the bore. Only when the head 7 of the fastening means 3 acts upon the end 4a of the spring, close to the head, is said spring axially compressed or shortened as a result of the further screwing-in operation. If, as in the situation shown in FIG. 7, there is an offset between the center longitudinal axis 33 of the bore 5 of the assembly part 2 and the center longitudinal axis 58 of the basic structure, said offset can be compensated for by means of radial play 60 which is present between the counter element 54 or the individual projections 55 and the shank 6 and/or radial play 62 between the spring end 4b, remote from the head, and the wall of the bore 5.

Figure 6:
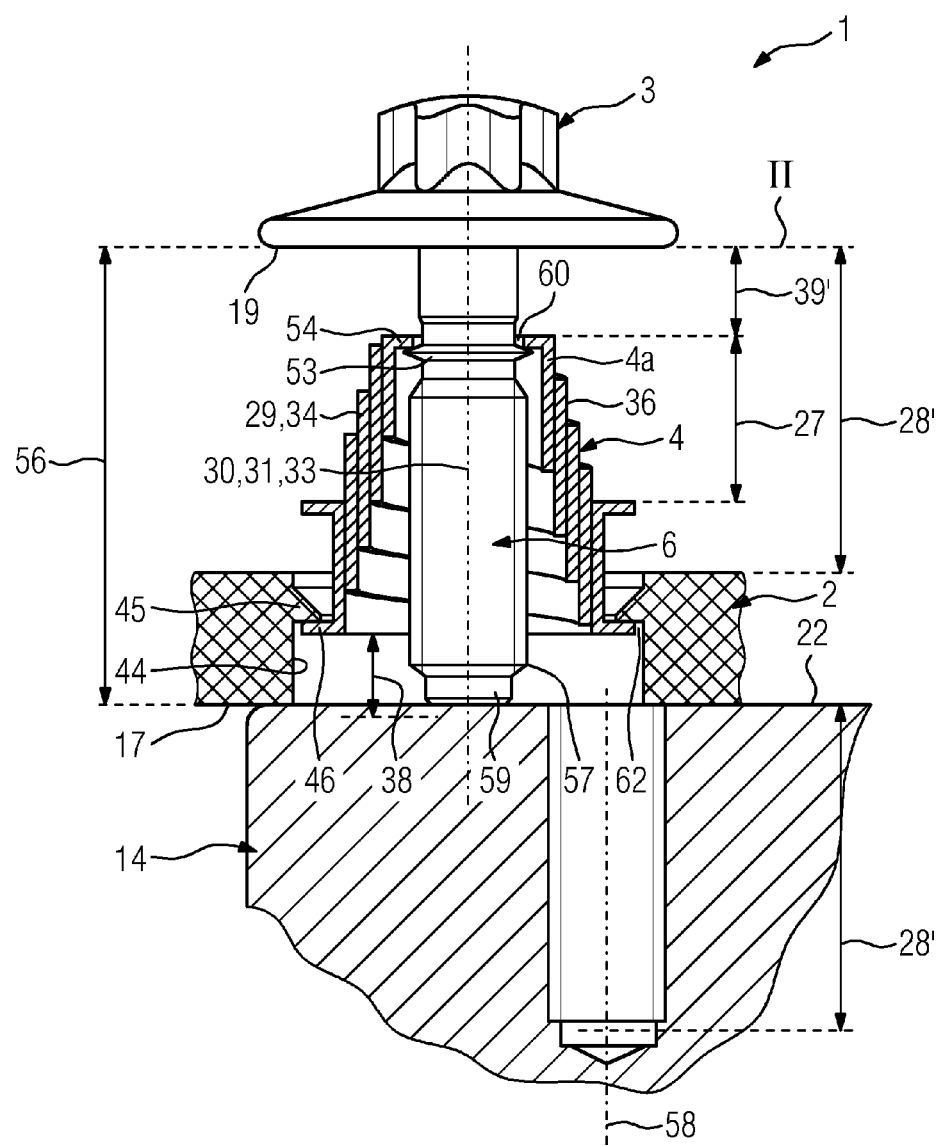
FIG. 6 shows a representation corresponding to FIG. 5, in this case however a fastening means with a longer shank being used.
Figure 7:
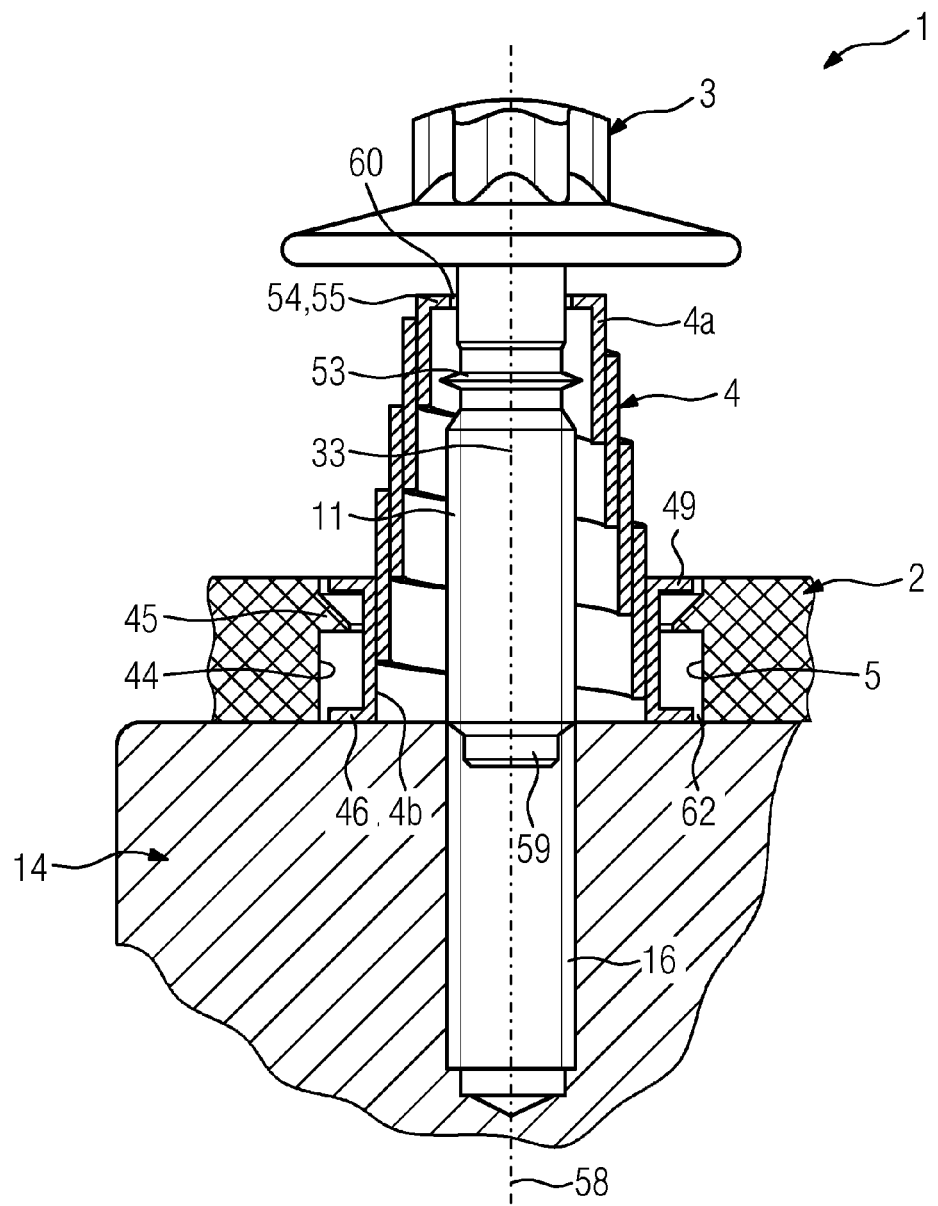
FIG. 7 shows a pre-assembly state where, differently to the images according to FIG. 5 and FIG. 6, the assembly part is aligned in relation to the basic structure such that the center longitudinal axis of the fastening means is aligned with the center longitudinal axis of a counter bore which is present in the basic structure.
Figure 8:
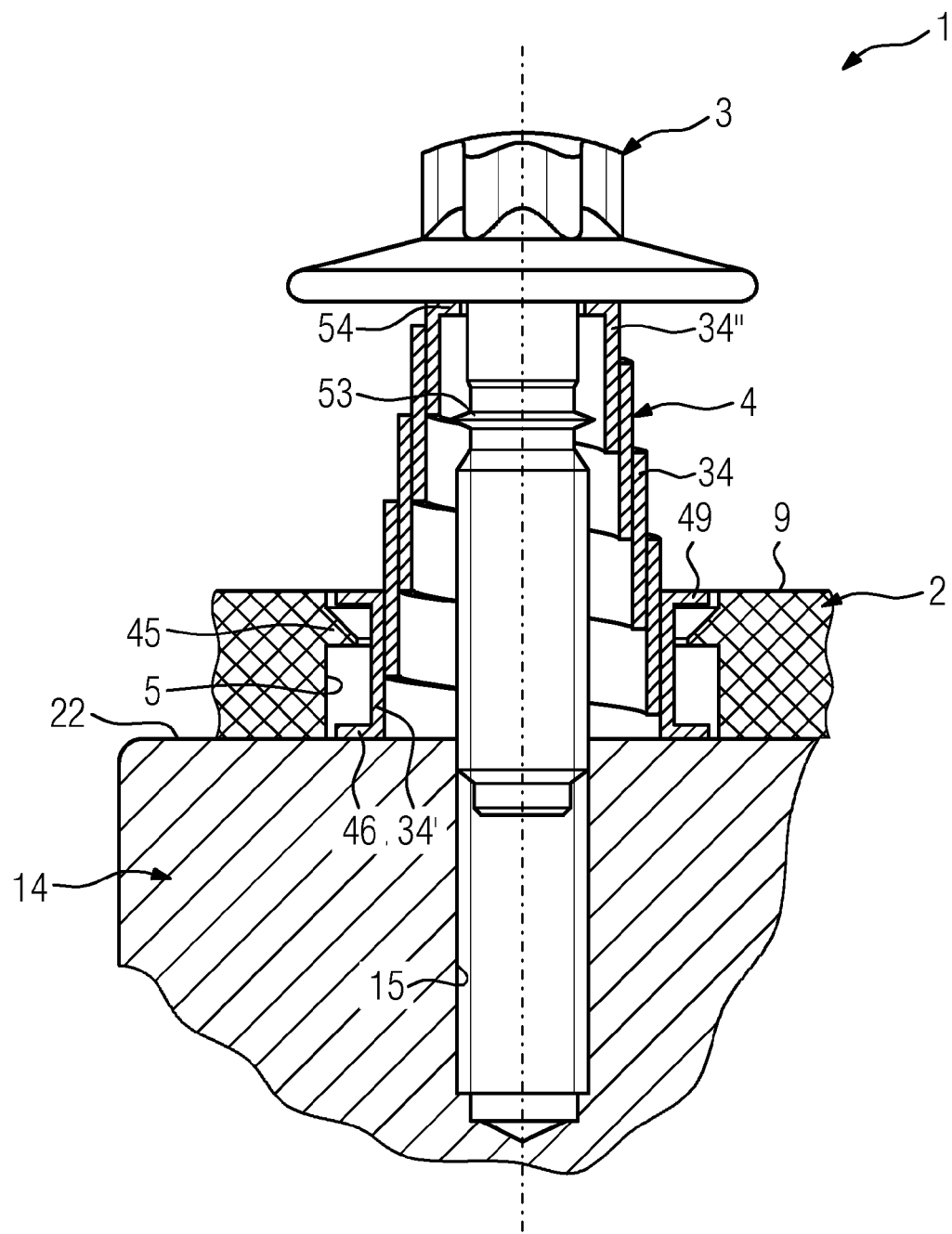
FIG. 8 shows a situation which, compared to the one shown in FIG. 7, differs by the fastening means already having been screwed a little further into the thread of the counter bore.

The shank 6 of the fastening means 3 can be dimensioned axially such that the axial displaceability, which is produced from axial play 38 and 39 in addition to the spring travel 27, is not fully utilized. Thus, in the case of the example shown in FIG. 5, the spring 4 is only displaced in the axial direction 24 relative to the assembly part 2 by a dimension corresponding to the protrusion 43 (FIG. 1). In addition, the engaging-behind element 53 on the shank 6 is arranged at an axial spacing 61 to the counter element 54 which interacts with it for realizing a positive-locking fit. An exemplary embodiment where the shank 6 comprises a length 56 which requires full utilization of the axial play 38 and 39 in the pre-assembly situation, is shown in FIG. 6.

When, during the assembly operation, an assembly unit 2, in a situation corresponding to FIG. 1, is placed onto the counter surface 22 of the basic structure, if the fastening means 3 tips relative to the center longitudinal axis 33 of the bore 5 of the assembly part 2 or is positioned incorrectly relative to the counter surface 22, there is the risk of the fastening means 3 remaining in said incorrect position after it has been placed onto the counter surface 22. Correct introduction of the shank 6 into the bore 15 of the basic structure 14 would then no longer be ensured. In order to avoid such an incorrect position of the fastening means 3, the radially innermost winding 34" of the spring 4 is developed such that the top edge 63 of the radially innermost winding 34" facing the head 7 runs in a plane E1 (FIG. 1) which extends orthogonally with respect to the center longitudinal axis 33 of the bore 5 of the assembly part 2 when the spring is situated in its maximum extended state. In this way, it is ensured that the bottom surface 19 of the head, which rests on the innermost winding 34", extends in the plane E1 and consequently the fastening means 3 extends with its center longitudinal axis 31 at right angles with respect to the counter surface 22 of the basic structure or with respect to the assembly surface 17 of the assembly part 2.

One possibility to ensure this is to develop the innermost winding 34" of the spring 4 such that its top edge 63 in the maximum shortened state of the spring 4 extends in a plane E2 which extends obliquely with respect to the center longitudinal axis 33 of the bore 5 (FIG. 9). The inclination of the top edge 63 or of the plane E2 is designed such that, in the maximum elongated state of the spring 4, which it assumes in the axial position II of the fastening means or in a pre-assembly situation according to FIG. 1, it extends in the plane E1 which is orthogonal with respect to the center longitudinal axis 33 of the bore 5. It is also conceivable for the radially innermost winding 34" of the spring 4 to be developed such that it or its top edge 63 always, that is independently of the respective spring deflection, extends in a plane E1 which extends orthogonally with respect to the center longitudinal axis 33 of the bore 5.

Figure 11:
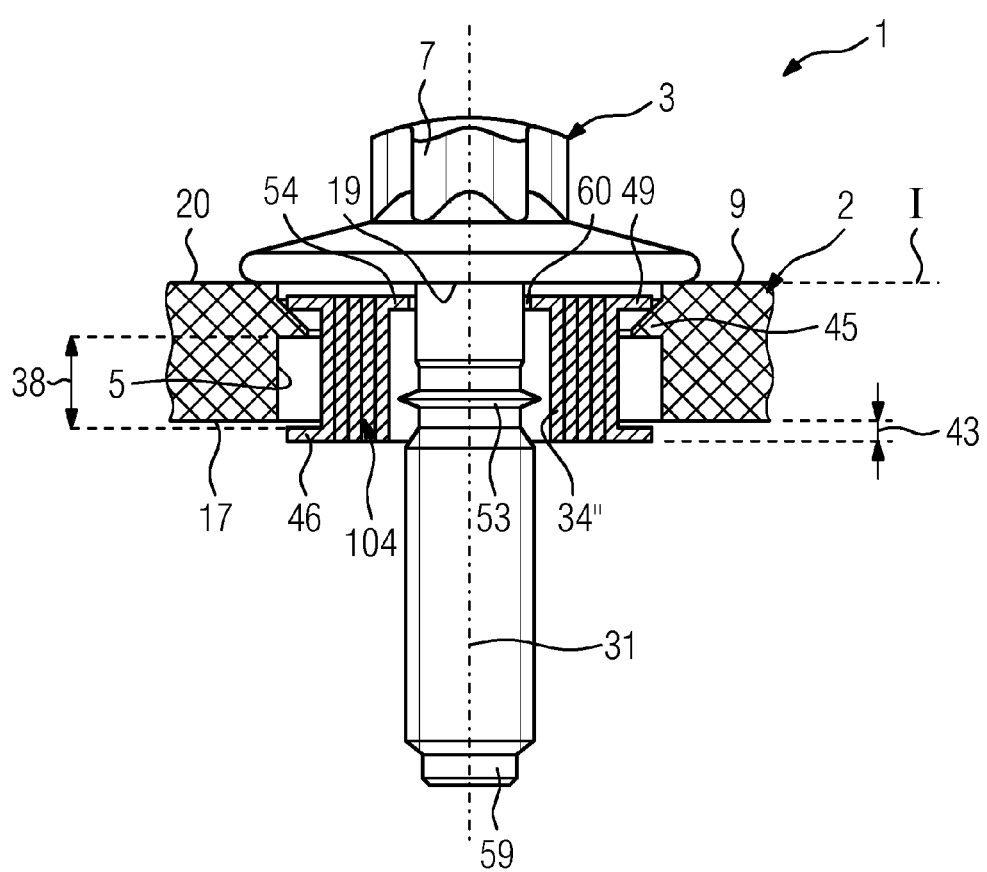
FIG. 11 shows a further exemplary embodiment with a spring realized as a tension spring, in a pre-assembly state in which the fastening means is situated in its first axial position.
Figure 12:
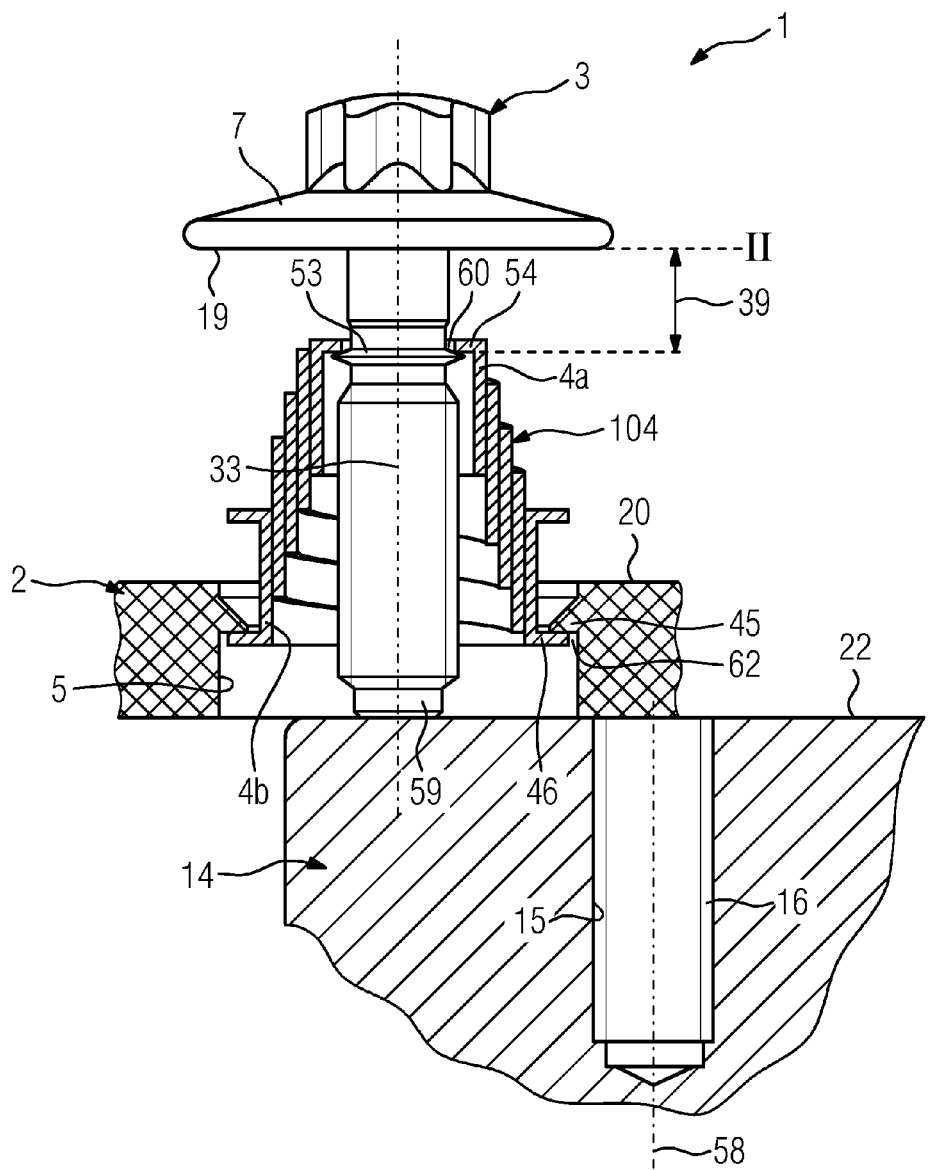
FIG. 12 shows a representation that corresponds to FIG. 6.
Figure 13:
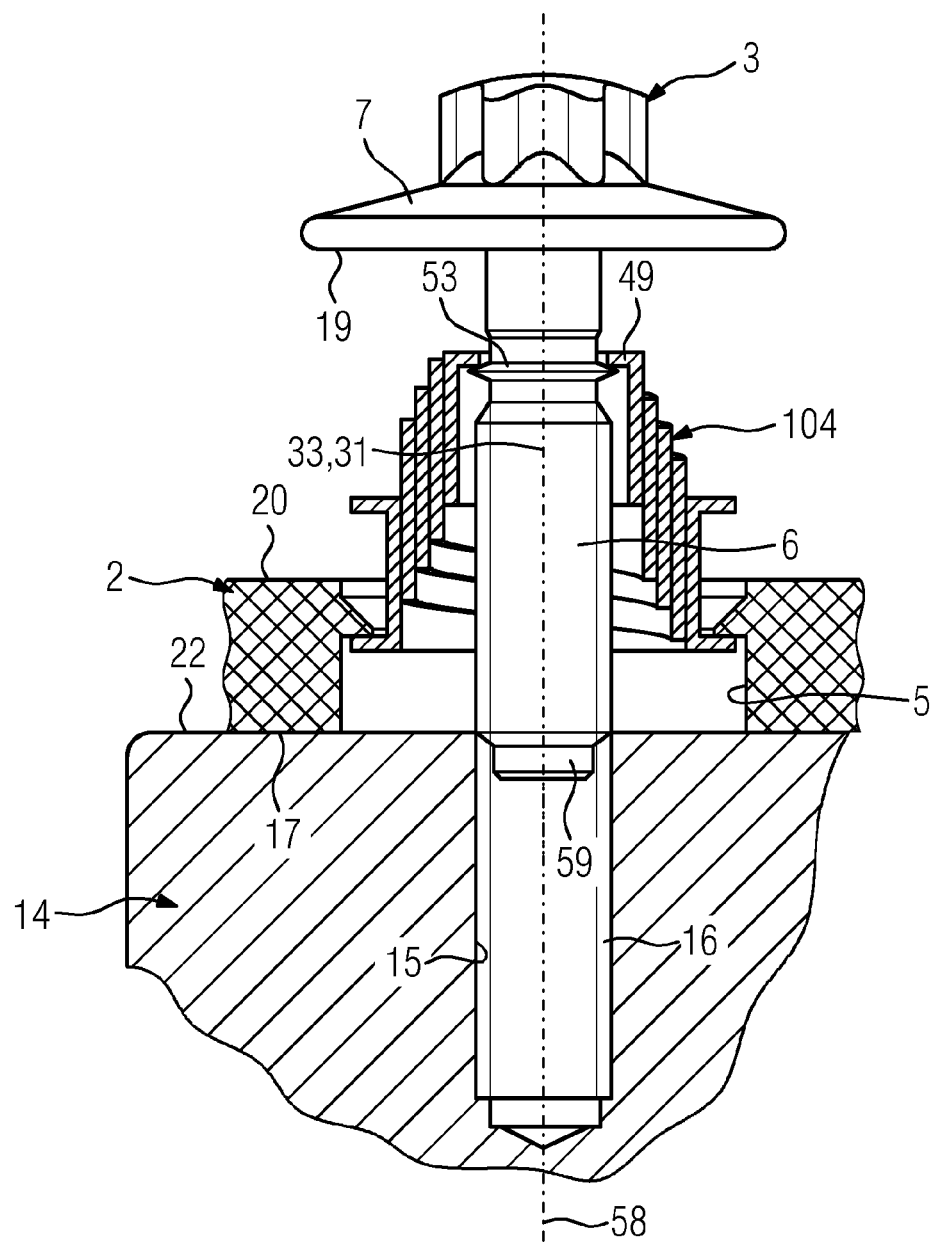
FIG. 13 shows a representation that corresponds to FIG. 7.
Figure 14:
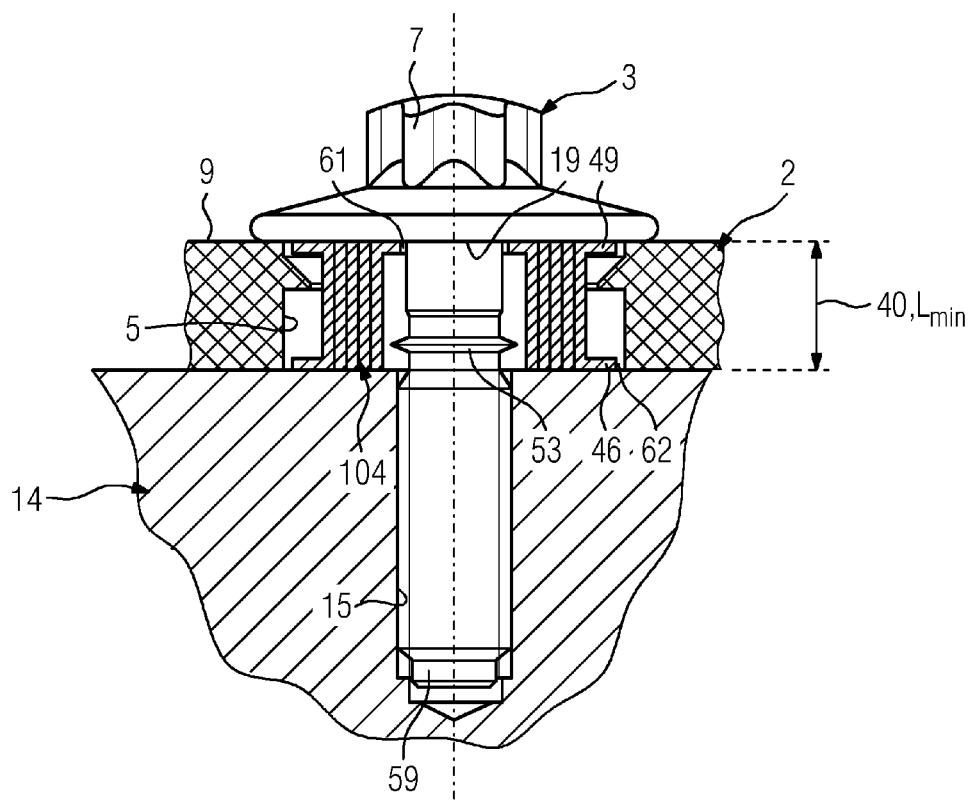
FIG. 14 shows a representation that corresponds to FIG. 9.

In the case of the exemplary embodiment shown in FIGS. 11 to 14, the spring 104 is a tension spring. Said tension spring is shortened to its minimum length $L_{min}$ in its non-loaded state. The length $L_{min}$, corresponds substantially to the bore length 40. The minimum length $L_{min}$, just as in the case of the above-described compression spring 4, is determined by the axial length 35 of the band-like spring wire 29. The spring 104 is developed substantially as the compression spring of the exemplary embodiments of FIGS. 1 to 10. In contrast to these, its maximum length $L_{max}$ is dependent on the axial position of the engaging-behind element 53 in the axial position II of the fastening means 3, in which said fastening means abuts against the counter surface 22 of the basic structure 14 by way of its shank 6 in the pre-assembly state (FIG. 12). Whereas the compression spring 4 acts upon the counter surface 22 of the basic structure 14 and the bottom surface 19 of the head by way of its end 4b, remote from the head, in the final assembly state, in the case of the tension spring 104, there is no such axial force application.

When, during the assembly, an assembly unit 1, which is situated in a situation according to FIG. 11, is placed onto the counter surface 22 of the basic structure 14, the fastening means 3, proceeding from the situation shown in FIG. 11, is displaced axially against the spring force of the spring 104, the engaging-behind element 53 on the shank 6 of the fastening means 3 striking against the radially inwardly protruding counter element 54 and, as a result, elongating the spring and finally being held in its maximum elongated state in which it comprises the length $L_{max}$. The fastening means 3, in this case, is situated in its second axial position II.

The counter element 46 of the spring 104, remote from the head, is in this case pressed against the side of the engaging-behind element 45 facing the basic structure 14 in the bore 5 of the assembly part 2. As a result of the effect of the elongated spring 104, the shank 6 of the fastening means 3 is pressed onto the counter surface 22 of the basic structure 14.

The risk of the fastening means 3 being incorrectly positioned in the abovementioned manner also exists when a spring 104 is realized as a tension spring. There is no such incorrect positioning in the state of the assembly unit according to FIG. 11 in which said assembly unit is supplied to a basic structure 14 insofar as the bottom surface 19 of the head is aligned orthogonally with respect to the center longitudinal axis 3 of the bore 5 in the first axial position I of the fastening means 3. This is the case, for example, when the bottom surface 19 of the head of the fastening means head 7 abuts against the top surface 20 or against the bore edge 9 of the assembly part (FIG. 11). Incorrect positioning of the fastening means 3 during the axial displacement of the fastening means 3 when placing the assembly unit 1 onto the basic structure can be avoided when the counter elements 54 on the radially innermost windings 34" are arranged in a common plane E1 which extends orthogonally with respect to the center longitudinal axis 33 of the bore 5. Such a position of the counter elements 54, which is independent of the respective operating position or lengthening of the spring 104, can be achieved as a result of the radially innermost winding 34" of the spring 4a being developed such that it maintains its position with reference to the spring axis 30 or the center longitudinal axis 33 of the bore 5 independently of the respective lengthening of the spring 104.

When, proceeding from the situation shown in FIG. 12, the assembly unit 1 is aligned on the counter surface 22 of the basic structure 14 such that the center longitudinal axis 33 of the bore 5 is in alignment with center longitudinal axis 58 of the bore 15 of the basic structure, the shank 6, with its search portion 59 in front as a result of the effect of the spring 104, is inserted into the bore 15 until the end of the thread 11 of the shank, remote from the head, strikes against the internal thread 16 of the bore. The fixing portion 13 of the fastening means 3 can then be screwed fully into the bore 15 such that, in the final assembly state according to FIG. 14, the fastening means head 7 acts upon the bore edge 9 of the assembly part by way of the bottom surface of its head with the prestressing force of the fastening means 3. In the case of the spring 104, its minimum length $L_{min}$ can also be dimensioned such that it serves or does not serve selectively as a spacing element. In the first-mentioned case, as depicted above, the main part of the prestressing force is introduced into the basic structure 14 by means of the maximum shortened spring 104 and acts upon the assembly part 2 in the region of the bore edge 9 in the force shunt with part of the prestressing force.

Figure 15:
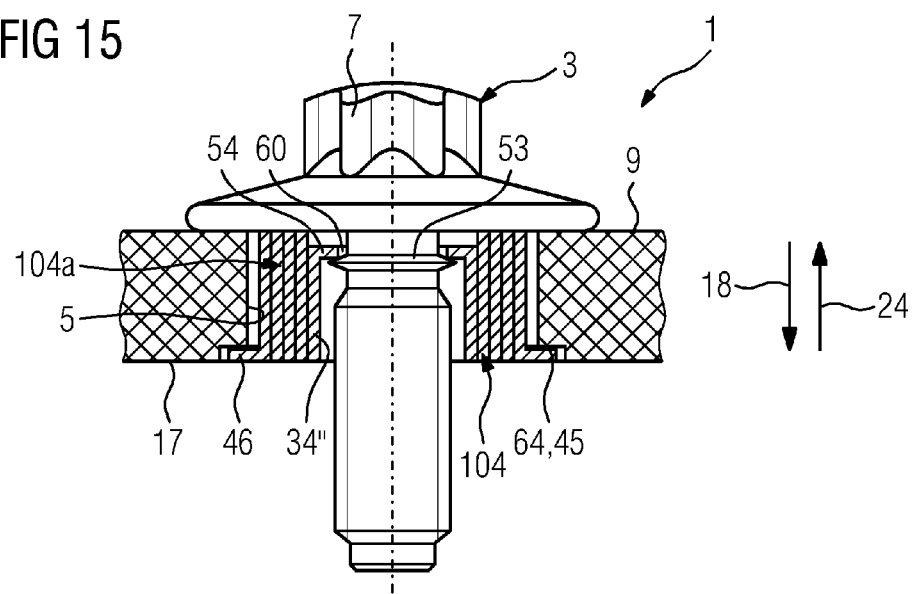
FIG. 15 shows an exemplary embodiment with a tension spring which is fixed on the assembly part so as not to be movable.
Figure 16:
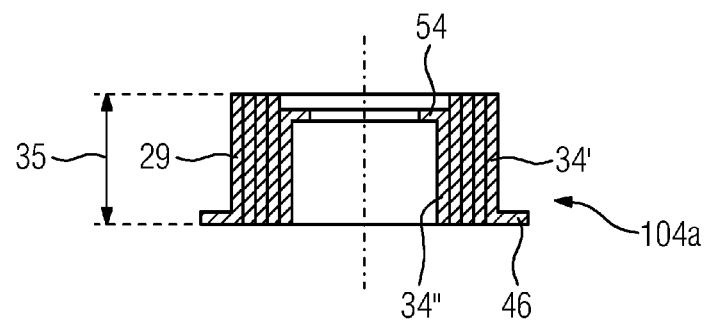
FIG. 16 shows a sectional representation of the spring from FIG. 15.

FIGS. 15, 16 show an exemplary embodiment of an assembly unit 1 where the spring 104a comprises only the counter element 46, remote from the head, on its radially outermost spring wire winding 34'. For realizing a positive-locking fit in the second axial direction 24, the bore 5 is widened at its end which opens out into the assembly surface 17 so as to form a radial shoulder 64. The radial shoulder 64 forms the engaging-behind element 45 which interacts with the counter element 46 of the spring 104a, it being engaged from behind by the counter element 46. The second positive-locking fit, which also serves for captively mounting the spring 104a in the bore 5 and is produced in the case of the above-described exemplary embodiments by the interaction between the engaging-behind element 45 in the bore 5 and the counter element 49, close to the head, is brought about by the engaging-behind element 53, which is present on the shank 6 and is preferably realized as an annular projection, and the counter element 54, which projects radially inward on the spring end 4a, close to the head, or on the innermost winding 34" of the spring wire and with the head 7 which overlaps the bore edge 9.

Figure 17:
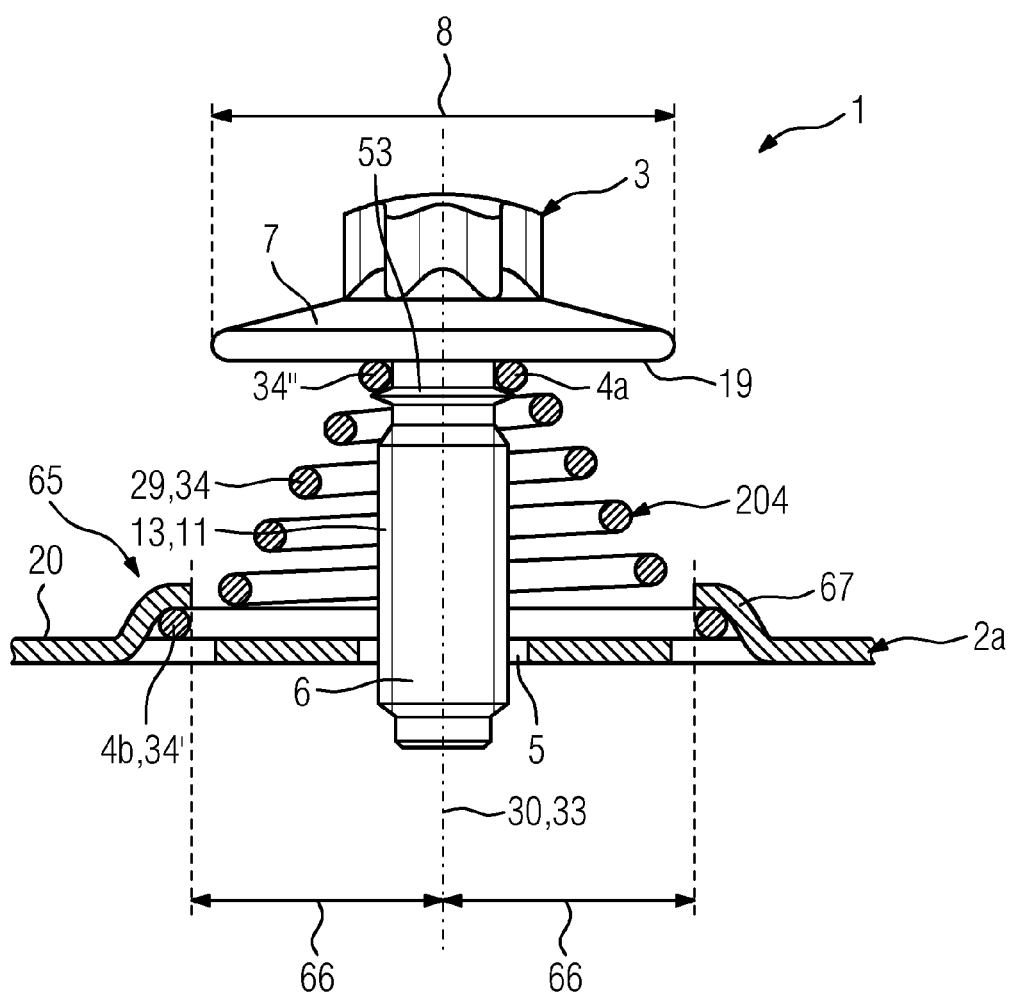
FIG. 17 shows a further realization variant of an assembly unit in a pre-assembly state where the spring is fixed on the top surface of the assembly part.
Figure 18:
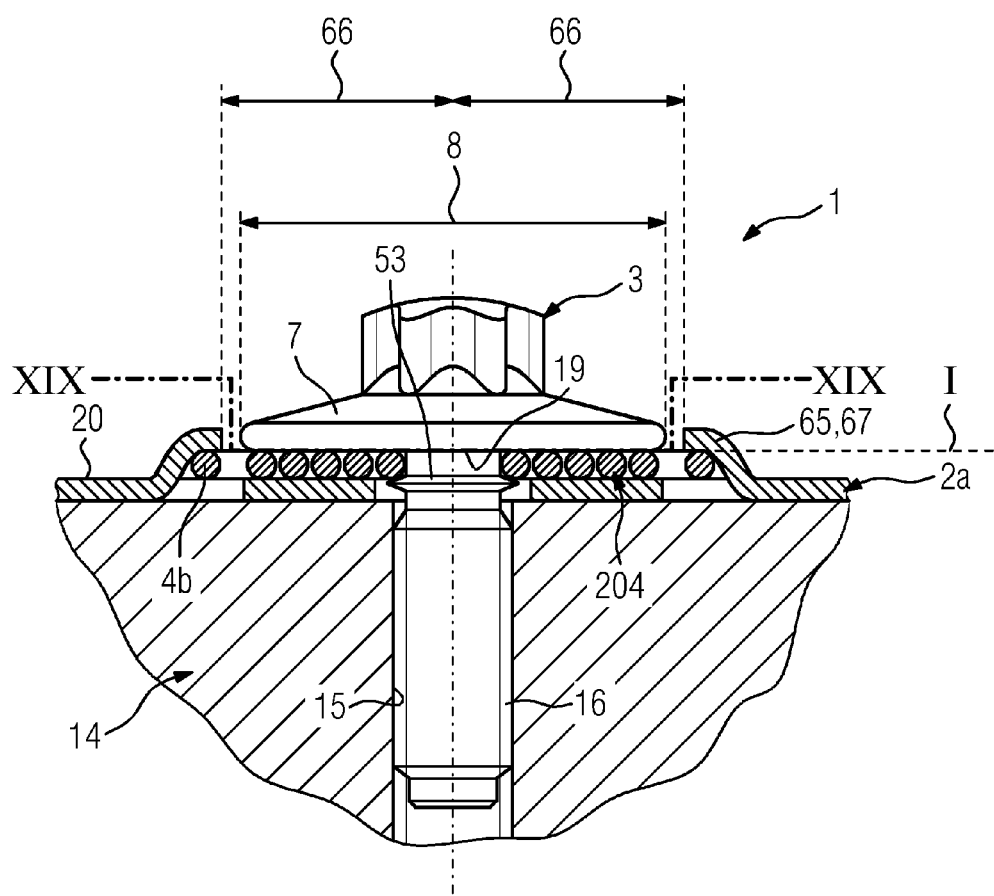
FIG. 18 shows the assembly unit from FIG. 17 in the final assembly state.

The illustrations in FIGS. 17 to 19 show an exemplary embodiment of an assembly unit 1 which includes a spring 204, the end 4b of which, remote from the head, is fixed on the top surface 20 of an assembly part 2a which is realized as a sheet metal part. The spring 204 is also a helical spring, the spring wire 29 of which or the windings 34 formed from said spring wire not overlapping in the axial direction. The radially outermost winding 34' of the spring wire 29, which is realized, for example, with a round cross section, is fixed at fixing points 65 on the top surface 20 of the assembly part 2a. The radial spacing 66 between the fixing points 65 and the spring axis 30 is greater than half the diameter 8 of the head 7 of the fastening means 3. In the final assembly state, the head consequently does not act upon the fixing points 65 themselves by way of its bottom surface 19, but upon the windings 34 of the spring 204 which are located radially inside the fixing points.

In the exemplary embodiment shown, the spring 204 is fixed on the assembly part 2a so as not to be axially movable. The fixing points 65 are formed in the form of tongues 67 which are cut free, for example, from the assembly part 2a. The tongues 67 are bent beyond the top surface 20 of the assembly part 2 and extend radially inward, clamping the radially outermost winding 34' between them and the top surface 20 of the assembly part.

There is also no axial play between the spring 204 and the shank 6 of the fastening means 3. Rather, the innermost winding 34" is clamped axially between the engaging-behind element 53, which is present on the shank 6, and the bottom surface 19 of the head. The radially innermost winding 34" is wound such that the engaging-behind element 53, which is preferably realized as an annular projection, engages behind the named winding at least over part of its circumference in the radial direction on its side remote from the head. The advantage of mounting the spring 204 on the shank 6 in an axially and radially fixed manner is that with this type of fixing, the fastening means can be held easier in an alignment which is parallel or coaxial to the center longitudinal axis 33 of the bore 5.

The spring wire 29 of the spring 4, 104, 204 is wound such that its direction of winding 68 corresponds to the direction of rotation 69 of the thread 11 of the fastening means. For example, with a right-handed thread, in the case of a top view onto the thread, the thread flanks ascend to the right. In other words, a thread of this type has to be rotated in a clockwise direction of rotation when screwing into a counter thread. The direction of rotation is reversed with a left-handed thread. The winding direction 68 of the spring wire 29 is that direction in which the spring wire 29—when viewed in a direction which runs parallel to the spring axis 30 and extends away from the head 7 of the fastening means 3 and toward the end thereof remote from the head—is wound from radially outside to radially inside. As can be seen in particular in FIG. 19, in the case of said development, when screwing a fastening means into a bore 15 of the basic structure 14 in the direction of rotation 69, the windings 34 are entrained in the direction of rotation 68 as a result of friction with the bottom surface 19 of the head. In this case, the windings 34 are constricted so as to form or enlarge a radial spacing 70 which is present between them. In this way, when screwing a fastening means 3 into the bore 15 of a basic structure 14, the axially overlapping windings 34 are prevented from pressing against one another so as to obstruct the shortening of the spring.

The invention claimed is:

1. An assembly unit having an assembly part which is penetrated by a bore and is to be fixed on a basic structure, having a shank, a head which protrudes radially beyond the shank and overlaps a bore edge in a radial manner and, on its end remote from the head, a fastening means which comprises a fixing portion and is held in a captive manner in the bore so as to be movable between a first axial position and a second axial position, wherein in the first axial position the shank protrudes from a bearing surface of the assembly part remote from the head at a maximum protrusion which comprises at least part of the fixing portion, and wherein in the second axial position the fixing portion does not protrude from the assembly surface or protrudes, however, at a protrusion that is reduced compared to the first axial position, and having a spring, which holds the fastening means in a captive manner in the bore, is fixed with its one spring end, close to the head, on the shank and with its other spring end, remote from the head, on the assembly part, is formed from a wound spring wire and encompasses the shank, the spring wire thereof being wound helically in such a manner that windings thereof do not overlap in the radial direction with reference to the spring axis), characterized in that the spring is arranged at least in part inside the bore of the assembly part and—the length of the spring in the maximum shortened state is dimensioned such that, in a final assembly state in which the assembly part is clamped with the basic structure, the head of the fastening means acts upon the maximum shortened spring in an axial manner and in this case at least a predominant part of a prestressing force of the fastening means is directed into the basic structure in the main force load by means of the spring.

2. The assembly unit as claimed in claim 1, characterized in that the windings of the spring wire overlap in a direction of the spring axis at least in the second axial position of the fastening means.

3. The assembly unit as claimed in claim 2, characterized in that the spring wire is formed from a band with wide sides which extend in the direction of the spring axis.

4. The assembly unit as claimed in claim 1, characterized in that the spring is fixed so as to be axially movable on the assembly part.

5. The assembly unit as claimed in claim 1, characterized in that the spring is fixed so as to be axially movable on the fastening means.

6. The assembly unit as claimed in claim 1, characterized in that in its maximum shortened state, the spring comprises a length which is smaller than the bore length, wherein the spring is arranged fully inside the bore.

7. The assembly unit as claimed in claim 1, characterized in that, the spring end remote from the head is fixed on the assembly part with a positive-locking fit in a first axial direction which points to the head.

8. The assembly unit as claimed in claim 7, characterized in that an engaging-behind element, which forms the positive-locking fit with the spring end remote from the head, projects radially inward from a wall of the bore.

9. The assembly unit as claimed in claim 8, characterized in that the engaging-behind element is an annular projection.

10. The assembly unit as claimed in claim 8, characterized in that a radially outwardly projecting counter element, which is engaged-behind by the engaging-behind element on its side facing the head, is present on the spring end remote from the head of the spring.

11. The assembly unit as claimed in claim 7, characterized in that the end of the spring remote from the head is additionally fixed in a positive-locking manner in the bore in a first axial direction which points away from the head.

12. The assembly unit as claimed in claim 11, characterized in that a second counter element, which is engaged behind by the engaging-behind element on its side remote from the head, protrudes radially outward from the spring end remote from the head, wherein between the counter elements there is an axial spacing which is greater than the axial length of the engaging-behind element.

13. The assembly unit as claimed in claim 1, characterized in that the spring end close to the head is fixed in a positive-locking manner on the shank of the fastening means in the second axial direction which points away from the head.

14. The assembly unit as claimed in claim 13, characterized in that an engaging-behind element, which forms a positive-locking fit with the spring end close to the head, projects radially from the shank.

15. The assembly unit as claimed in claim 14, characterized in that the engaging-behind element is an annular projection.

16. The assembly unit as claimed in claim 14, characterized in that a radially inwardly projecting counter element, which is engaged behind by the engaging-behind element on its side remote from the head, is present on the spring end close to the head.

17. The assembly unit as claimed in claim 13, characterized in that an axial spacing which enables axial mobility of the spring in relation to the fastening means, is present in the second axial position of the fastening means.

18. The assembly unit as claimed in claim 1, characterized in that radial play is present between the spring and the assembly part.

19. The assembly unit as claimed in claim 1, characterized in that radial play is present between the spring and the shank of the fastening means.

20. The assembly unit as claimed in claim 1, characterized in that the fixing portion is realized as a thread, wherein—when looking in a direction which extends parallel to the spring axis, away from the head of the fastening means and toward the end thereof remote from the head—a direction of rotation, in which the spring wire is wound from radially outside to radially inside, corresponds to the direction of rotation of the thread.

* * * * *